United States Patent
Park et al.

(10) Patent No.: US 12,438,220 B2
(45) Date of Patent: Oct. 7, 2025

(54) SECONDARY BATTERY COMPRISING SEAL TAPE

(71) Applicant: LG Energy Solution, Ltd., Seoul (KR)

(72) Inventors: Jeong Eon Park, Daejeon (KR); Roun Kim, Daejeon (KR); Wook Hee Jang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/721,285

(22) PCT Filed: Jul. 19, 2023

(86) PCT No.: PCT/KR2023/010382
§ 371 (c)(1),
(2) Date: Jun. 18, 2024

(87) PCT Pub. No.: WO2024/019513
PCT Pub. Date: Jan. 25, 2024

(65) Prior Publication Data
US 2025/0062463 A1    Feb. 20, 2025

(30) Foreign Application Priority Data
Jul. 19, 2022    (KR) .......................... 10-2022-0088822

(51) Int. Cl.
*H01M 50/186*    (2021.01)
*C09J 133/08*    (2006.01)
(Continued)

(52) U.S. Cl.
CPC ......... *H01M 50/186* (2021.01); *C09J 133/08* (2013.01); *H01M 10/0587* (2013.01);
(Continued)

(58) Field of Classification Search
CPC .. H01M 50/186; H01M 50/19; H01M 50/197; H01M 50/198; H01M 50/193;
(Continued)

(56) References Cited

U.S. PATENT DOCUMENTS

| | | |
|---|---|---|
| 2007/0154787 A1 | 7/2007 | Jang et al. |
| 2012/0115025 A1* | 5/2012 | Kim .................. H01M 10/0431 429/186 |

(Continued)

FOREIGN PATENT DOCUMENTS

| | | |
|---|---|---|
| JP | H6150971 A | 5/1994 |
| JP | H11121044 A | 4/1999 |

(Continued)

OTHER PUBLICATIONS

Office Action for Korean Application No. 10-2022-0088822 dated Nov. 28, 2023. 5 pgs.

(Continued)

*Primary Examiner* — Christopher P Domone
(74) *Attorney, Agent, or Firm* — Lerner David LLP

(57) ABSTRACT

A secondary battery includes an electrode assembly, an electrolyte solution, a seal tape, and a can. The electrode assembly has a structure in which a positive electrode, a negative electrode, and a separator are in a wound state. The seal tape includes a base and an adhesive layer provided on one surface of the base. The can accommodates the electrode assembly and the electrolyte solution. The negative electrode is disposed along an outer circumferential surface of the electrode assembly and the seal tape is provided on the outer circumferential surface. The adhesive layer is configured to expand when in contact with the electrolyte solution.

19 Claims, 1 Drawing Sheet

[1-1]

[1-2]

(51) Int. Cl.
  *H01M 10/0587* (2010.01)
  *H01M 50/184* (2021.01)
  *H01M 50/193* (2021.01)
  *H01M 50/197* (2021.01)
  *H01M 50/198* (2021.01)

(52) U.S. Cl.
  CPC ....... *H01M 50/184* (2021.01); *H01M 50/193* (2021.01); *H01M 50/197* (2021.01); *H01M 50/198* (2021.01); *C09J 2203/33* (2013.01); *C09J 2301/122* (2020.08); *C09J 2433/00* (2013.01); *C09J 2475/006* (2013.01)

(58) Field of Classification Search
  CPC ............. H01M 50/184; H01M 10/0587; C09J 2203/33
  See application file for complete search history.

(56) References Cited

U.S. PATENT DOCUMENTS

| | | | |
|---|---|---|---|
| 2013/0280570 A1* | 10/2013 | Kim | H01M 4/04 429/246 |
| 2014/0106207 A1 | 4/2014 | Kim et al. | |
| 2014/0162122 A1 | 6/2014 | Kato et al. | |
| 2015/0270524 A1 | 9/2015 | Hwang et al. | |
| 2016/0177136 A1* | 6/2016 | Park | C09J 7/385 429/185 |
| 2018/0083305 A1 | 3/2018 | Kim et al. | |
| 2020/0044276 A1* | 2/2020 | Sakai | H01M 10/0468 |
| 2020/0076005 A1 | 3/2020 | Oki et al. | |
| 2023/0268557 A1 | 8/2023 | Takai et al. | |
| 2023/0299443 A1 | 9/2023 | Kim et al. | |

FOREIGN PATENT DOCUMENTS

| | | | |
|---|---|---|---|
| JP | 2003151634 | A | 5/2003 |
| JP | 2007184238 | A | 7/2007 |
| JP | 2014516373 | A | 7/2014 |
| JP | 2015008140 | A | 1/2015 |
| JP | 2016528357 | A | 9/2016 |
| JP | 2017073328 | A | 4/2017 |
| KR | 20070096649 | A | 10/2007 |
| KR | 20120087103 | A | 8/2012 |
| KR | 20130052410 | A | 5/2013 |
| KR | 20150020146 | A | 2/2014 |
| KR | 101378679 | B1 | 3/2014 |
| KR | 20140051324 | A | 4/2014 |
| KR | 20140063478 | A | 5/2014 |
| KR | 20150111723 | A | 10/2015 |
| KR | 20170101653 | A | 9/2017 |
| KR | 101807909 | B1 | 12/2017 |
| KR | 20180008037 | A | 1/2018 |
| KR | 20180031962 | A | 3/2018 |
| KR | 20180041528 | A | 4/2018 |
| KR | 20220066600 | A | 5/2022 |
| WO | 2018105398 | A1 | 6/2018 |
| WO | 2018142928 | A1 | 8/2018 |
| WO | 2022024703 | A1 | 2/2022 |
| WO | 2022035270 | A1 | 2/2022 |

OTHER PUBLICATIONS

International Search Report for PCT/KR2023/010382 mailed Oct. 31, 2023. 5 pages.

* cited by examiner

[Figure 1]
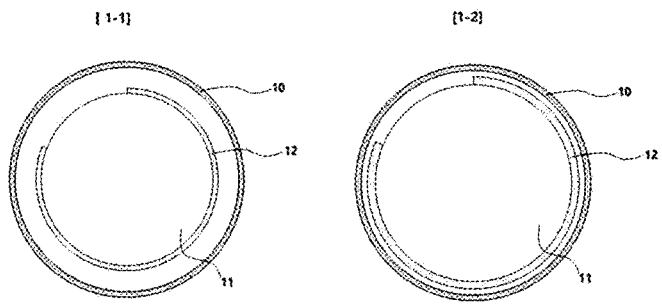
[Figure 2]
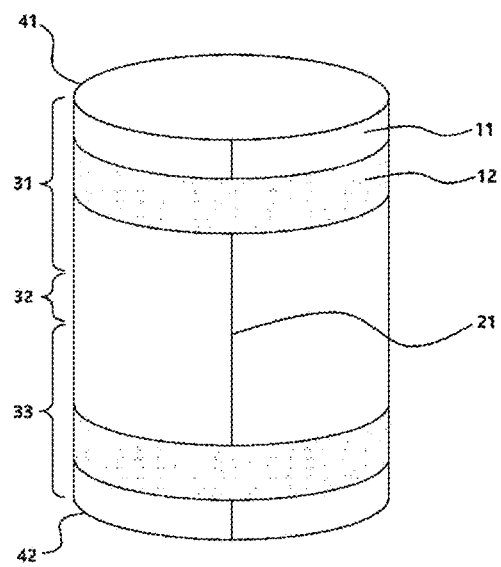
[Figure 3]
| | COMPARATIVE EXAMPLE 1 | EXAMPLE 1 |
|---|---|---|
| CT image | THERE IS A GAP BETWEEN CU FOIL-CAN | THERE IS NO GAP BETWEEN CU FOIL-CAN |
| mΩ | 18.36 | 12.06 |

SECONDARY BATTERY COMPRISING SEAL TAPE

CROSS-REFERENCE TO RELATED APPLICATIONS

The present application is a national phase entry under 35 U.S.C. § 371 of International Application No. PCT/KR2023/010382, filed on Jul. 19, 2023, which claims priority from Korean Patent Application No. 10-2022-0088822, filed on Jul. 19, 2022, all of which are incorporated herein by reference.

TECHNICAL FIELD

The present invention relates to a secondary battery including a seal tape.

BACKGROUND ART

In recent years, as there has been increasing demand for portable electronic products such as laptop computers, video cameras, and mobile phones and the development of electric vehicles, batteries for energy storage, robots, and satellites has begun in earnest, a lot of research has been conducted on secondary batteries that are used as drive power sources for these products.

Examples of such secondary batteries include nickel-cadmium batteries, nickel-metal hydride batteries, nickel-zinc batteries, and lithium secondary batteries. Among such various secondary batteries, lithium secondary batteries are widely used in the field of advanced electronic devices because they are freely chargeable/dischargeable due to almost no memory effect compared with nickel-based secondary batteries, have a very low self-discharge rate, a high operating voltage and a high energy density per unit weight.

In general, a lithium secondary battery is configured by stacking or winding an electrode assembly composed of a positive electrode, a negative electrode, and a separator interposed between the positive electrode and the negative electrode, embedding the stacked or wound electrode assembly in a metal can or a laminate sheet case, and injecting or impregnating an electrolyte solution thereinto.

An electrode assembly having a positive electrode/separator/negative electrode structure constituting the secondary battery is largely divided into a jelly-roll type (wound type) electrode assembly and a stack type (stacked type) electrode assembly according to its structure. The jelly-roll type electrode assembly has a structure in which a separator is interposed between long sheet-like positive and negative electrodes coated with an active material, which is then wound, and a stack type electrode assembly has a structure in which a plurality of positive and negative electrodes with a predetermined size are sequentially stacked with a separator interposed therebetween. Among them, the jelly-roll type electrode assembly has advantages in that it is easy to manufacture, has a high energy density per weight and is structurally stable.

Since a cylindrical battery including such a jelly-roll type electrode assembly is standardized, it is required to maximize performance within a limited space.

Technical Problem

The present specification is to provide a secondary battery including a jelly-roll type electrode assembly having a negative electrode on an outer circumferential surface, in which a seal tape that absorbs an electrolyte solution and then expands is attached to the outer circumferential surface of the electrode assembly, thereby inducing the electrode assembly to unwind from the seal tape after the electrolyte solution is injected into a can and increasing a contact area between the negative electrode positioned on the outer circumferential surface of the electrode assembly and an inside of the can to reduce a resistance of the battery.

Technical Solution

An exemplary embodiment of the present invention provides a secondary battery including an electrode assembly having a structure in which a positive electrode, a negative electrode, and a separator are wound; an electrolyte solution; and a can in which the electrode assembly and the electrolyte solution are accommodated, wherein the negative electrode is positioned on an outer circumferential surface of the electrode assembly, wherein a seal tape is provided on the outer circumferential surface of the electrode assembly, wherein the seal tape includes a base and an adhesive layer provided on one surface of the base, and wherein the adhesive layer has expansibility with respect to the electrolyte solution.

Advantageous Effects

According to an aspect of the present invention, the seal tape having expansibility with respect to the electrolyte solution is attached to the negative electrode positioned on the outer circumferential surface of the electrode assembly. Therefore, when the electrolyte solution is injected into the battery can, the adhesive layer of the seal tape absorbs the electrolyte solution and expands, so that the seal tape is detached from the electrode assembly. As a result, the wound electrode assembly is partially unwound, thereby increasing a contact area between the negative electrode on the outer circumferential surface of the electrode assembly and an inside of the battery can to provide low resistance characteristics of the battery.

BRIEF DESCRIPTION OF DRAWINGS

FIG. 1 schematically shows a secondary battery according to an exemplary embodiment of the present invention.

FIG. 2 schematically shows a secondary battery according to an exemplary embodiment of the present invention.

FIG. 3 is a CT image of batteries prepared in Example 1 and Comparative Example 1.

EXPLANATION OF REFERENCE NUMERALS AND SYMBOLS

10: cylindrical can
11: electrode assembly
12: seal tape
21: finishing portion
31: upper part of outer circumferential surface
32: central part of outer circumferential surface
33: lower part of outer circumferential surface
41: upper end portion of outer circumferential surface
42: lower end portion of outer circumferential surface

DETAILED DESCRIPTION

Hereinafter, the present specification will be described in more detail.

In the present specification, when a part is referred to as "including" a certain component, it means that the part can further include another component, not excluding another component, unless explicitly described to the contrary.

Throughout the present specification, when a member is referred to as being "on" another member, the member can be in direct contact with another member or an intervening member may also be present.

In the present specification, when a portion is referred to as being connected to another portion, this includes not only a case where they are directly connected, but also a case where they are indirectly connected with another element interposed therebetween.

Hereinafter, preferred exemplary embodiments of the present invention will be described in detail with reference to the accompanying drawings. However, it should be understood that the embodiments of the present invention may be modified in various forms and the scope of the present invention is not limited to the embodiments described below. In the detailed description of the operating principle for the preferred exemplary embodiment of the present invention, when it is determined that a detailed description of related known functions or configurations may unnecessarily obscure the subject matter of the invention, the detailed description will be omitted. In addition, the same reference numerals are used for parts having similar functions and operations throughout the drawings.

An exemplary embodiment of the present invention provides a secondary battery including an electrode assembly having a structure in which a positive electrode, a negative electrode, and a separator are wound; an electrolyte solution; and a can in which the electrode assembly and the electrolyte solution are accommodated, wherein the negative electrode is positioned on an outer circumferential surface of the electrode assembly, wherein a seal tape is provided on the outer circumferential surface of the electrode assembly, wherein the seal tape includes a base and an adhesive layer provided on one surface of the base, and wherein the adhesive layer has expansibility with respect to the electrolyte solution.

In general, in a cylindrical battery including a jelly-roll type electrode assembly, a separator is positioned on an outer circumferential surface of the electrode assembly. Since the electrode assembly is standardized, it is required to maximize the performance within a limited space. Therefore, in general, it is planned to improve the performance of the secondary battery by maximizing the capacity and lowering the resistance. In this case, in order to maximize the capacity of the battery, a content of the input electrode should be increased, and in order to lower the resistance, the number of negative electrode tabs should be increased. However, it is difficult to increase the number of negative electrode tabs indefinitely in the internal space of the battery. In addition, there is a problem in that weldability with the battery can is lowered as the number of tabs increases. Further, if the content of the electrode is increased in order to maximize the capacity of the battery, there arises a problem in that it is not easy to add an electrode tab because the internal space of the battery is reduced.

Therefore, in order to compensate for the above problems, a method of lowering resistance by positioning the negative electrode on an outer circumferential surface of the electrode assembly to increase a contact area between the negative electrode and the inside of the can has been developed. In this case, in order to stably maintain the contact between the negative electrode and the inside of the can, an internal gap between the negative electrode and the inside of the can should be minimized.

However, before inserting the jelly-roll type electrode assembly into the can, a seal tape should be attached to the outer circumferential surface of the electrode assembly in order to prevent the electrode assembly from unwinding, and the internal gap should be provided to some extent between the can and the electrode assembly for smooth insertion. If the gap is insufficient, the appearance of the electrode assembly is damaged during insertion, and problems such as poor insertion occur.

In this case, in the case of using the existing seal tape, the electrode assembly is firmly fixed, so that the stress caused due to contraction/expansion of the electrode resulting from charging/discharging of the secondary battery cannot be relieved, leading to problems such as electrode disconnection, cracks, and metal elution.

An embodiment of the present invention is characterized in that the negative electrode is positioned on the outer circumferential surface of the electrode assembly, and the seal tape having expansibility with respect to an electrolyte solution to absorb the electrolyte solution and to expand is used on the outer circumferential surface of the electrode assembly. When inserting the electrode assembly into a can and injecting the electrolyte solution, the adhesive layer of the seal tape absorbs the electrolyte solution, and expands as a result of the adhesive force disappearing, leading to unwinding of the electrode assembly.

Therefore, the rolled electrode assembly is unwound due to detachment of the seal tape and contraction/expansion of the electrode, resulting in an increase in contact area between the negative electrode positioned on the outer circumferential surface of the electrode assembly and the can, and a decrease in resistance of the battery.

In addition, since the seal tape stably fixes the jelly roll before inserting the electrode assembly into the can, unwinding of the electrode assembly can be prevented and insertion of the electrode assembly can be facilitated.

In an exemplary embodiment of the present invention, the seal tape includes a base; and an adhesive layer provided on one surface of the base.

Below, the adhesive layer included in the seal tape will be described in detail.

In an exemplary embodiment of the present invention, the adhesive layer has expansibility with respect to the electrolyte solution. Having expansibility with respect to the electrolyte solution means that a structure of the adhesive layer is deformed by the electrolyte solution, for example, the adhesive layer absorbs the electrolyte solution after contact with the electrolyte solution and expands. That is, the adhesive layer may be in an expanded form by absorbing the electrolyte solution.

The seal tape may absorb the electrolyte solution and expand to form a three-dimensional stereoscopic structure. Specifically, the adhesive layer may absorb electrolyte solution and expand to form a three-dimensional stereoscopic structure. For example, the adhesive layer may expand in a thickness direction and/or a length direction of the adhesive layer upon contact with the electrolyte solution, thereby forming a three-dimensional stereoscopic structure. In the above, the "three-dimensional stereoscopic structure" of the seal tape is formed through actions of an expansive force of the adhesive layer of the seal tape in contact with the electrolyte solution and a peeling-off force from the base, and may be a concept including all structures capable of enabling the adhesive layer to detach from the electrode assembly.

According to one example, the three-dimensional stereoscopic structure may include a plurality of shapes protruding in a direction perpendicular to the length direction of the adhesive layer. In the above, the "length direction" may refer to a direction perpendicular to the thickness direction of the adhesive layer when the adhesive layer is kept horizontal. In addition, the "perpendicular" or "horizontal" refers to "substantially perpendicular or horizontal" within a range that does not impair the desired effect, and for example, may include an error of about ±10 degrees, ±5 degrees, or ±3 degrees.

In an exemplary embodiment of the present invention, the adhesive layer may have a center line average roughness value of 100 μm to 250 μm measured after 24 hours from a time point of contact with the electrolyte solution.

Specifically, the center line average roughness (Ra) after contact with the electrolyte solution may be 150 μm to 240 μm or 155 μm to 230 μm. The center line average roughness (Ra) may be a value measured on the surface of the adhesive layer after 24 hours from the time point of contact with the electrolyte solution.

In an embodiment of the present invention, when the center line average roughness of the three-dimensional stereoscopic structure formed by the adhesive layer is controlled to be within the above range, the seal tape can be efficiently detached from the outer circumferential surface of the electrode assembly.

The "center line average roughness" refers to a value which can be obtained from Equation 1 below in a unit of micrometers when a cross-section of the adhesive layer having a stereoscopic structure is photographed, a cross-section of a three-dimensional stereoscopic structure is mathematically remodeled from the photographed image to obtain a roughness curve, and then data is extracted by a reference length L in a direction of an average line on the roughness curve, in which the direction of the average line is represented as an x axis, a height direction is represented as a y axis, and the roughness curve is represented by y=f(x).

$$R_a = \frac{1}{L}\int_0^L |f(x)|dx \quad \text{[Equation 1]}$$

The center line average roughness may be measured under a specification of ASTM D4417, or may be obtained as defined in JIS B0031 or JIS B0601.

In an exemplary embodiment of the present invention, the adhesive layer may include a cured product of an adhesive composition, and may include a polymer included in the adhesive composition in a crosslinked form.

In an exemplary embodiment of the present invention, the adhesive composition may include a polymer having a polymerization unit derived from a (meth)acrylic acid ester monomer, a monomer having a polar functional group, and a crosslinkable monomer containing a crosslinkable functional group.

In one example, in the case of a secondary battery manufactured by attaching the seal tape including the adhesive layer formed by the adhesive composition to the electrode assembly via the adhesive layer, and inserting the electrode assembly into a battery can, the adhesive layer is deformed, for example, swelled or expanded due to the presence of the polar functional group present in the adhesive layer when in contact with the electrolyte solution injected into the secondary battery. In this case, since the seal tape forms a three-dimensional stereoscopic structure and a surface of the adhesive layer has a surface roughness value within a specific range, thereby reducing an adhesive force or peeling-off force between the electrode assembly and the adhesive layer, the adhesive layer may be detached from the electrode assembly.

The adhesive composition includes a polymer having a polymerization unit. According to one example, the polymer may include, for example, a (meth)acrylic acid ester monomer, a monomer having a polar functional group, and a crosslinkable monomer having a crosslinkable functional group in a polymerized form.

As the (meth)acrylic acid ester monomer included as a polymerization unit in the polymer, for example, an alkyl (meth)acrylate may be used, and in consideration of cohesive force, glass transition temperature, adhesiveness, or the like of the adhesive, alkyl (meth)acrylate having an alkyl group having 1 to 14 carbon atoms may be used. Examples of such a monomer may include one or two or more of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate may be exemplified, but are not limited thereto.

In the above, "(meth)acrylate" refers to acrylate or methacrylate, which may be applied to other terms using "(meth) ."

The monomer having the polar functional group is a monomer having an excellent affinity with an electrolyte solution, and is included as a polymerization unit in the polymer of the adhesive composition in order to reduce an adhesive force or peeling-off force between the electrode assembly and the adhesive layer by being deformed, for example, swelled or expanded when the adhesive layer formed by the adhesive composition is in contact with the electrolyte solution. In addition, in the present application, by applying a monomer having a specific structure as the monomer having the polar functional group, a stereoscopic structure having a specific surface roughness may be formed when the seal tape is in contact with the electrolyte solution, and accordingly, the seal tape may be detached from the electrode assembly with an excellent efficiency to induce isotropic volume expansion and contraction of the electrode assembly and to effectively prevent disconnection of the electrode.

In an exemplary embodiment of the present invention, the monomer having the polar functional group may be represented by Chemical Formula 1 below.

[Chemical Formula 1]

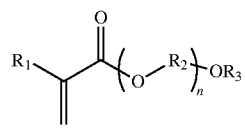

In Chemical Formula 1, $R_1$ is hydrogen or an alkyl group having 1 to 12 carbon atoms, $R_2$ is an alkylene group having 1 to 6 carbon atoms, R₃ is hydrogen, an alkyl group having 1 to 12 carbon atoms, an aryl group having 6 to 24 carbon atoms, or an arylalkyl group having 6 to 48 carbon atoms, and n is 0 or greater.

In Chemical Formula 1, the alkyl group having 1 to 12 carbon atoms may be a straight chain or branched chain alkyl group.

In Chemical Formula 1, $R_1$ is hydrogen, an alkyl group having 1 to 12, 1 to 8, or 1 to 4 carbon atoms, and may be, for example, hydrogen, a methyl group, an ethyl group, a propyl group, a butyl group, a pentyl group, a hexyl group, and the like, and preferably hydrogen or a methyl group is preferable. However, the present application is not limited thereto.

In addition, in Chemical Formula 1, $R_2$ is an alkylene group having 1 to 6, 1 to 4, or 1 to 2 carbon atoms, and may be, for example, ethylene or propylene. However, the present application is not limited thereto.

$R_3$ is hydrogen, an alkyl group having 1 to 12, 1 to 8, 1 to 6, or 1 to 4 carbon atoms; an aryl group having 6 to 24, 6 to 20, 6 to 18, or 6 to 12 carbon atoms; or an arylalkyl group having 6 to 48, 6 to 30, 6 to 24, or 6 to 18 carbon atoms, and may be, for example, hydrogen, a methyl group, an ethyl group, a propyl group, a phenyl group, a naphthal group, a butylphenol group, a pentylphenol group, a hexylphenol group, a heptylphenol group, an octylphenol group, a nonylphenol group, or the like. However, the present application is not limited thereto.

In addition, n may be 0 or greater, for example, 1 or greater, preferably 2 or greater.

In an exemplary embodiment of the present invention, the monomer represented by Chemical Formula 1 may be a monomer represented by Chemical Formula 2 below.

[Chemical Formula 2]

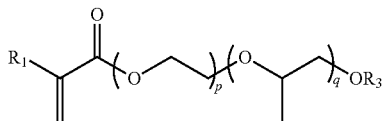

In Chemical Formula 2, $R_1$ and $R_3$ are defined as described above, p+q is 1 or greater, p is 0 to 100, and q is 0 to 100.

Examples of the monomer represented by Chemical Formula 1 or Chemical Formula 2 may include methoxyethyl (meth)acrylate, methoxyethoxyethyl (meth)acrylate, ethoxyethoxyethyl (meth)acrylate, ethoxytriethyleneglycol (meth)acrylate, polyethyleneglycol (meth)acrylate, polyethyleneglycolmethylether (meth)acrylate, ethoxylated nonylphenol (meth)acrylate, propoxylated nonylphenol (meth)acrylate, ethoxylated phenol (meth)acrylate, and polypropyleneglycol (meth)acrylate, and preferably, methoxyethyl (meth)acrylate, methoxyethoxyethyl (meth)acrylate, ethoxyethoxyethyl (meth)acrylate, ethoxytriethyleneglycol (meth)acrylate, polyethyleneglycol (meth)acrylate, or polyethyleneglycolmethylether (meth)acrylate, but is not particularly limited thereto.

Since the monomer represented by Chemical Formula 1 or Chemical Formula 2 includes at least one oxygen atom and exhibits a very high polarity due to the high electronegativity of the oxygen atom, the adhesive layer including the monomer may have a high affinity with a polar electrolyte solution, and may expand when in contact with the electrolyte solution. Meanwhile, the term "electrolyte solution" in the above may refer to, for example, a medium for ion conduction used in a secondary battery. In one example, the electrolyte solution may be an electrolyte solution that is a medium in a liquid state, but is not limited thereto. In the present specification, the electrolyte solution is also expressed as an electrolyte.

The polymer may include the monomer represented by Chemical Formula 1 in a polymerized form in an amount of 30 to 300 parts by weight, for example, 40 to 280 parts by weight or 44 to 250 parts by weight with respect to 100 parts by weight of a (meth)acrylic acid ester monomer, but the present application is not limited thereto. In addition, the monomer represented by Chemical Formula 1 may be included in an amount of 25 to 80 parts by weight, for example, 25 to 75 parts by weight or 30 to 70 parts by weight with respect to 100 parts by weight of the total monomer included as a polymerization unit in the polymer. If the monomer represented by Chemical Formula 1 is included too little, it is difficult for the adhesive layer to expand sufficiently to be detached from the electrode assembly when in contact with the electrolyte solution, and if the monomer represented by Formula 1 is included too much, due to excessive gelation occurring in a polymerization reaction of the polymer, it may be difficult to realize adhesiveness of the adhesive. Therefore, in consideration of these points, a content of the monomer having the polar functional group may be controlled to be within the above-described range. In the present specification, "parts by weight" refers to a relative "weight ratio", unless particularly defined otherwise.

The crosslinkable monomer having a crosslinkable functional group is a monomer that can be copolymerized with the (meth)acrylic acid ester monomer or other monomers included in the polymer, and can provide a main chain of the polymer after copolymerization with a crosslinking point capable of reacting with the multifunctional crosslinking agent. In the above, the crosslinkable functional group may be a hydroxyl group, a carboxyl group, an isocyanate group, a glycidyl group, an amide group or the like, and in some cases, may be a photocrosslinkable functional group such as an acryloyl group or a methacryloyl group. In the case of the photocrosslinkable functional group, it may be introduced by reacting a compound having a photocrosslinkable functional group with the crosslinkable functional group provided by the copolymerizable monomer. The crosslinkable monomer containing the hydroxyl group may be, but is not limited to, for example, a monomer including a hydroxyl group such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxyethyleneglycol (meth)acrylate, glycerol (meth)acrylate, or hydroxypropyleneglycol (meth)acrylate, or a monomer in which at least one thereof is mixed. The carboxyl group-containing monomer may be, but is not limited to, for example, (meth)acrylic acid, carboxyethyl (meth)acrylate, carboxypentyl (meth)acrylate, itaconic acid, maleic acid, fumaric acid, or crotonic acid. In addition, the crosslinkable monomer including a glycidyl group may be, but is not limited to, for example, an epoxycycloalkylalkyl (meth)acrylate such as glycidyl (meth)acrylate, an epoxyalkyl (meth)acrylate, or epoxycyclohexylmethyl (meth)acrylate. The crosslinkable monomer including an isocyanate group may be, but is not limited to, for example, 2-isocyanatoethyl (meth)acrylate, 1,1-bis(acryloyloxymethyl)ethyl isocyanate, (meth)acryloyloxy ethyl isocyanate, meth-isopropyl-α,α-dimethylbenzyl isocyanate, methacryloyl isocyanate, or allyl isocyanate; an acryloyl monoisocyanate compound obtained by reacting a diisocyanate compound or a polyisocyanate compound with 2-hydroxyethyl (meth)acrylate; or an acryloyl monoisocyanate compound obtained by reacting a diisocyanate compound or a polyisocyanate compound with a polyol compound and 2-hydroxyethyl (meth)acrylate. The amide group-containing monomer may be, but is not limited to, for example, (meth)acrylamide, diethylacrylamide, N-vinylpyrrolidone, N,N-dimethyl(meth)acrylamide, N,N-diethyl(meth)acrylamide, N,N'-methylenebisacrylamide, N,N-dimethylaminopropylacrylamide, N,N-dimethylaminopropylmethacrylamide, or diacetone(meth)acrylamide. In addition, the amino group-containing monomer may be, but is not limited to, for example, aminoethyl(meth)acrylate, N,N-dimethylaminoethyl(meth)acrylate, or N,N-dimethylaminopropyl(meth)acrylate. The alkoxysilyl group-containing monomer may be, but is not limited to, trimethoxysilylpropyl (meth)acrylate or allyloxyethyl (meth)acrylate.

The polymer may include a crosslinkable monomer in a polymerized form in an amount of 0.1 to 10 parts by weight, for example, 2.5 to 10 parts by weight, 2.9 to 9 parts by weight, or 2.9 to 8 parts by weight with respect to 100 parts by weight of a (meth)acrylic acid ester monomer, but the present application is not limited thereto. In addition, the crosslinkable monomer may be included in an amount of 0.1 to 5 parts by weight, for example, 0.5 to 3 parts by weight or 1 to 2 parts by weight with respect to 100 parts by weight of the total monomer included as a polymerization unit in the polymer. If the crosslinkable monomer is included too much, due to an excessively low peeling-off force, it may be difficult for the adhesive layer to fix the electrode assembly, and if the crosslinkable monomer is included too little, it is difficult for the adhesive layer to expand sufficiently to be detached from the electrode assembly when in contact with an electrolyte solution. Therefore, in consideration of these points, a content of the crosslinkable monomer may be controlled to be within the above-described range.

In an exemplary embodiment of the present invention, the adhesive layer may include a cured product of an adhesive composition including a polymer having a polymerization unit derived from a (meth)acrylic acid ester monomer, a monomer represented by Chemical Formula 1, and a crosslinkable monomer containing a crosslinkable functional group.

The polymer may further include another functional comonomer as needed in a polymerized form, and for example, may be a monomer represented by Chemical Formula 3 below.

[Chemical Formula 3]

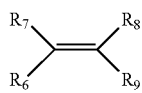

In Chemical Formula 3, $R_6$ to $R_8$ each independently represent hydrogen or an alkyl group, $R_9$ represents a cyano group; a phenyl group unsubstituted or substituted with an alkyl group; an acetyloxy group; or $COR_{10}$, and $R_{10}$ represents an amino group or glycidyloxy group unsubstituted or substituted with an alkyl group or an alkoxyalkyl group.

In the definition of $R_6$ to $R_{10}$ in Chemical Formula 3, the alkyl group or alkoxy group refers to an alkyl group or alkoxy group having 1 to 8 carbon atoms, and is preferably a methyl group, an ethyl group, a methoxy group, an ethoxy group, a propoxy group or a butoxy group.

A specific example of the monomer of Chemical Formula 3 may be, but is not limited to, a nitrogen-containing monomer such as (meth)acrylamide, N-butoxy methyl (meth)acrylamide, N-methyl (meth)acrylamide, (meth)acrylonitrile, N-vinyl pyrrolidone, or N-vinylcaprolactam; a styrene-based monomer such as styrene or methyl styrene; glycidyl (meth)acrylate; caprolactone; or vinyl ester of carboxylic acid such as vinyl acetate.

The polymer may be included in the composition in a form crosslinked by a multifunctional crosslinking agent. When the polymer is included in a crosslinked form, the adhesive layer formed of the composition may have a characteristic that it expands or swells when in contact with the electrolyte solution, and thus, it may prevent disconnection of an electrode. In addition, as the polymer is included in a crosslinked form, the adhesive layer formed of the adhesive composition may ensure a suitable cohesive force.

The type of multifunctional crosslinking agent for crosslinking the polymer is not particularly limited. For example, among known crosslinking agents such as an isocyanate crosslinking agent, an epoxy crosslinking agent, an aziridine crosslinking agent, a metal chelate crosslinking agent or a photocrosslinking agent, an appropriate crosslinking agent may be selected according to the type of crosslinkable functional group present in the polymer. Examples of the isocyanate crosslinking agent may include diisocyanate such as tolylene diisocyanate, xylene diisocyanate, diphenylmethane diisocyanate, hexamethylene diisocyanate, isophorone diisocyanate, tetramethylxylene diisocyanate or naphthalene diisocyanate, a reactant of the diisocyanate and polyol, and the like, and trimethylol propane and the like may be used as the polyol. As the epoxy crosslinking agent, ethylene glycol diglycidyl ether, triglycidyl ether, trimethylolpropane triglycidyl ether, N, N, N', N'-tetraglycidyl ethylenediamine, glycerin diglycidyl ether or the like may be used. Examples of the aziridine crosslinking agent may include N,N'-toluene-2,4-bis(1-aziridinecarboxamide), N,N'-diphenylmethane-4,4'-bis(1-aziridine carboxamide), triethylene melamine, bisisoprotaloyl-1-(2-methylaziridine), or tri-1-aziridinylphosphine oxide, and the like. Examples of the metal chelate crosslinking agent may include a compound in which polyvalent metal is coordinated with a compound such as acetylacetone or ethyl acetoacetate, and examples of the polyvalent metal may include aluminum, iron, zinc, tin, titanium, antimony, magnesium, vanadium or the like. As the photocrosslinking agent, multifunctional acrylate or the like may be used. Considering the type of crosslinkable functional group included in the polymer, one or two or more crosslinking agents may be used.

A weight ratio of the multifunctional crosslinking agent in the adhesive composition may be controlled to be within in a range in which a desired peeling-off force or a gel fraction described below may be ensured, for example. For example, the crosslinking agent may be included in an amount of 0.001 to 10 parts by weight, for example, 0.1 to 5 parts by weight or 0.5 to 4 parts by weight with respect to 100 parts by weight of the total composition, but the present application is not limited thereto. If the ratio of the multifunctional crosslinking agent is too low, the cohesive force of the adhesive layer may not be suitably ensured, and if the ratio of the multifunctional crosslinking agent is too high, an adhesive property may be degraded. Accordingly, a suitable range of the ratio may be selected in consideration of these points.

The polymer included in the adhesive composition may be manufactured by applying a mixture of the monomers as described above to a polymerization process such as solution polymerization, photo polymerization, bulk polymerization, suspension polymerization, or emulsion polymerization.

The polymer may have a weight average molecular weight (Mw) of approximately 300,000 to 2,500,000, 400,000 to 2,000,000, 500,000 to 2,000,000, 800,000 to 1,800,000, 600,000 to 1,200,000, 700,000 to 1,400,000, or 600,000 to 800,000. In the present specification, the weight average molecular weight may refer to a conversion value for standard polystyrene measured by gel permeation chromatography (GPC), and unless particularly defined otherwise, a molecular weight may refer to the weight average molecular weight. If the molecular weight of the polymer is too low, the cohesive force of the adhesive layer may be degraded, and if the molecular weight of the polymer is too high, the adhesive property may be degraded. Therefore, a suitable molecular weight may be selected in consideration of these points.

The adhesive composition may further include various additives known in the art as needed, in addition to the above-described components. For example, the adhesive composition may further include a tackifier. The tackifier may be, but is not limited to, for example, a rosin ester-based or styrene-based tackifier, and as needed, a suitable type may be selected and used. A content of the tackifier is not particularly limited, and may be controlled, in consideration of peeling-off force with the electrode assembly, and the like. In one example, the tackifier may be used in an amount of 1 to 25 parts by weight with respect to 100 parts by weight of the polymer.

The adhesive composition may further include an additive such as an initiator including a thermal initiator or a photoinitiator; an epoxy resin; a curing agent; a UV stabilizer; an antioxidant; a coloring agent; a reinforcing agent; a filler; a foaming agent; a surfactant; a photopolymerizable compound such as a multifunctional acrylate; or a plasticizer within a range that does not have an effect on a desired effect.

In one example, the polymer included in the adhesive composition may be manufactured through photopolymerization by selecting a suitable photoinitiator generally well known in the art. The photoinitiator may be applied to the photopolymerization by, but is not limited to, for example, an organic peroxide such as benzoylperoxide, 1,1-bis(tert-butylperoxy)-3,3,5-triethylcyclohexane, tertbutylperoxyacetate, tertbutylperoxybenzoate, tertbutyl peroxy-2-ethyl-hexanoate, tertbutyl peroxyisopropylcarbonate, di-2-ethylhexylperoxy dicarbonate, diisopropylperoxy dicarbonate, di-3-methoxybutylperoxy dicarbonate, di-3,3,5-trimethylhexanoyl peroxide, di-tert-butyl peroxide, lauroyl peroxide, dicumylperoxide, or methyletherketoneperoxide; a hydroperoxide such as butyl hydroperoxide or cumyl hydroperoxide; an oxidant such as hydrogen peroxide, ammonium peroxodisulfide, nitric acid and a salt thereof, perchloric acid and a salt thereof, sulfuric acid and a salt thereof, hypochlorous acid and a salt thereof, permanganic acid and a salt thereof, chromic acid and a salt thereof, lead dioxide, manganese dioxide, copper oxide, iron chloride, fluorine, chlorine, bromine, or iodine; a reductant such as sodiumborohydride, formaldehyde, acetaldehyde, amine, or hydrazine; an azo compound such as azobisisobutyronitrile (AIBN); a means for radiating heat, light, a UV ray, or a high energy wavelength; or electron transfer in an electrolyte solution.

A content of the photoinitiator may be, but is not particularly limited to, 0.01 to 5 parts by weight, for example, 0.01 to 1 part by weight or 0.01 to 0.5 part by weight with respect to 100 parts by weight of the total monomer mixture.

The adhesive layer may be formed, for example, by coating a coating solution, in which the polymer and the multifunctional crosslinking agent as described above are mixed, on the base, and inducing a crosslinking reaction between the polymer and the multifunctional crosslinking agent under appropriate conditions.

A thickness of the adhesive layer may be appropriately selected according to a use to be applied, for example, a desired peeling-off force, and the like, and is not particularly limited. The adhesive layer may be formed to have a thickness of approximately, for example, 2 µm to 100 µm, 3 µm to 50 µm, 4 µm to 25 µm, 4 µm to 15 µm, 4 µm to 10 µm, 4 µm to 9 µm, 4 µm to 7 µm, or 5 µm to 7 µm, which may, however, vary depending on the use.

The adhesive layer may be provided in a form including a pattern on one surface of the base. Specifically, the pattern may be a closed figure pattern, a linear pattern, or a mixed pattern of a closed figure pattern and a linear pattern. In one example, the pattern may be a lattice pattern or an S-shaped pattern, but is not limited thereto, and an appropriate pattern known in the art may be employed and applied.

In addition, the pattern may include a wavy pattern, a lattice pattern, or an embossed pattern in a relief form, but is not limited thereto, and an appropriate pattern known in the art may be employed and applied.

The wavy pattern may refer to a pattern formed by a wavy curve. In this case, the wavy curve may form a convex portion or a concave portion, and when a concavo-convex surface included in the adhesive layer includes the pattern as described above, the adhesion of the adhesive layer may be improved.

The lattice pattern may refer to a pattern formed by convex portions formed by intersecting linear concave portions. Alternatively, the lattice pattern may refer to a pattern formed by concave portions formed by intersecting linear convex portions. In this case, the formed convex portion or concave portion forms one lattice, and a shape of each lattice may be any one of a square, a rectangle, a parallelogram, and a rhombus. When the concave-convex surface included in the adhesive layer includes the pattern as described above, the adhesion of the adhesive layer may be improved.

The embossed pattern in a relief form may be, for example, a pattern in which spherical irregularities protrude in a relief form.

As described above, when the adhesive layer is provided (coated) in a form including a pattern, a contact area with the electrolyte solution increases, so that a diffusion rate of the electrolyte solution into the adhesive layer can be increased. When the diffusion rate of the electrolyte solution is increased, a rate at which the adhesive layer absorbs the electrolyte solution and expands is also increased, so the seal tape is detached from the electrode assembly more quickly. Therefore, the seal tape is detached immediately after the electrolyte solution is injected into the battery can, so that the unwinding of the electrode assembly is induced and the contact area between the negative electrode and the inside of the can be thus increased more stably. In addition, the detachment time is shortened, so that there is an advantage in that mass production quality can be secured after battery production. On the other hand, if the detachment time is delayed and the attached state of the seal tape continues, there is a problem in that the resistance deviation of the battery may increase during mass production quality check.

The seal tape may be a seal tape attached on the outer circumferential surface of the electrode assembly in the secondary battery. In addition, the seal tape according to an exemplary embodiment of the present invention includes the adhesive layer having an initial peeling-off force that is not excessively high and including a monomer having the above-described polar functional group, so that, when the seal tape is in contact with the electrolyte solution in the secondary battery, the adhesive layer absorbs the electrolyte solution and expands, and as a result, the peeling-off force of the adhesive layer may be controlled low to such an extent that the adhesive layer can be detached from the electrode assembly.

In an exemplary embodiment of the present invention, the seal tape may have an initial peeling-off force sufficient to fix the electrode assembly and to be detached from the electrode assembly when in contact with an electrolyte solution. If the initial peeling-off force of the electrode assembly is too high, it may be difficult for the adhesive layer to be detached from the electrode assembly even after contact with the electrolyte solution. For example, the adhesive layer may have a peeling-off force of 370 gf/25 mm or less, for example, 350 gf/25 mm or less, 315 gf/25 mm or less, or 312 gf/25 mm or less at room temperature measured at a peeling-off rate of 5 mm/sec and a peeling-off angle of 180 degrees, with respect to glass. The lower limit value of the peeling-off force of the adhesive layer with respect to glass is not particularly limited, and for example, when the adhesive layer has a very low initial peeling-off force, the adhesive layer loses an adhesive force when in contact with the electrolyte solution, and accordingly, the seal tape is detached from the electrode assembly, and thus disconnection of the electrode may be prevented. However, if the initial peeling-off force of the adhesive layer is too low, the electrode assembly may unwind without contact with the electrolyte solution before the electrode assembly is accommodated in a can. In consideration of this point, the lower limit value of the peeling-off force of the adhesive layer with respect to glass may be controlled to be 5 gf/25 mm or higher, for example, 10 gf/25 mm or higher, 20 gf/25 mm or higher, 30 gf/25 mm or higher, 40 gf/25 mm or higher, 50 gf/25 mm or higher, 60 gf/25 mm or higher, 70 gf/25 mm or higher, 80 gf/25 mm or higher, 85 gf/25 mm or higher, or 88 gf/25 mm or higher. When the adhesive layer has a peeling-off force within the above range with respect to glass, even when the adhesive layer is attached on the outer circumferential surface of the electrode assembly, the adhesive layer can exhibit an appropriate initial peeling-off force by which the adhesive layer is detached when in contact with the electrolyte solution, and can form a stereoscopic structure having a specific surface roughness when the seal tape is in contact with the electrolyte solution.

In an exemplary embodiment of the present invention, the seal tape may be in a state of being detached from the outer circumferential surface of the electrode assembly. That is, the seal tape may be in a state in which it loses an adhesive force without being attached to the outer circumferential surface.

The adhesive force of the seal tape after injecting the electrolyte solution is reduced by 80% or more based on the adhesive force of the seal tape before injecting the electrolyte solution. Specifically, the adhesive force may be reduced by 90% or more, 95% or more, or 99% or more.

In an exemplary embodiment of the present invention, the seal tape forms a stereoscopic structure as the adhesive layer absorbs the electrolyte solution and expands, and the peeling-off force of the adhesive layer may be lowered to such an extent that the adhesive layer can be detached from the electrode assembly. Accordingly, the adhesive layer may be detached from the outer circumferential surface of the electrode assembly. According to one example, the seal tape may be detached from the outer circumferential surface of the electrode assembly after contact with the electrolyte solution, and preferably, 50% or more, for example, 60% or more, 70% or more, or 80% or more of an area in which the seal tape is attached on the outer circumferential surface of the electrode assembly may be detached.

A thickness of the seal tape may be appropriately selected depending on a desired peeling-off force and the like, and is not particularly limited. The seal tape may be formed to have a thickness of approximately, for example, 10 to 100 μm, 15 to 75 μm, 20 to 45 μm, 15 to 40 μm, 20 to 40 μm, or 20 to 30 μm, and the thickness may be changed depending on the use. If the thickness of the seal tape is too small, an effect resulting from the expansion of the adhesive layer of the seal tape may be difficult to be exhibited, and on the contrary, if the thickness of the seal tape is too large, the thickness of the electrode assembly is also increased, which may cause great damage to the electrode assembly due to poor processability when inserting the electrode assembly into a battery case, or may cause a reduction in capacity for the same standard size.

The seal tape may further include a release sheet attached to the adhesive layer in order to protect the adhesive layer until the seal tape is used.

Below, the base included in the seal tape will be specifically described.

In an exemplary embodiment of the present invention, the base may include one or more films selected from the group consisting of a polypropylene film, a polyimide film, an acrylic film, a polyolefin film, a polyamide film, a polycarbonate film, a polyurethane film, a cellulose acetate film, and a polyester film, but is not limited thereto.

When the base includes a polyester film, the base may include one or more selected from the group consisting of a polyethylene terephthalate film, a polyethylene naphthalate film, and a polybutylene terephthalate film. When the base includes a cellulose-based base, the base may include one or more selected from the group consisting of a cellulose acetate resin and a cellulose alkylate resin, and a base manufactured by applying a mixture including the resin to an extrusion or casting process can be used. As the cellulose alkylate, for example, cellulose acetate propionate, cellulose acetate butylate or the like may be used.

In addition, in order to shorten the detachment time, the following bases can be introduced as a base for the seal tape.

In an exemplary embodiment of the present invention, the base may have expansibility with respect to an electrolyte solution. Specifically, the base may absorb the electrolyte solution after contact with the electrolyte solution. Specifically, a structure of the base may be deformed by absorbing the electrolyte solution. For example, the base may be deformed in the length direction after contact with the electrolyte solution.

As described above, when a base that absorbs the electrolyte solution after contact with the electrolyte solution is used, an electrolyte solution absorption rate of the adhesive layer is further increased because the electrolyte solution moves more freely through the base. Therefore, since the seal tape is detached more quickly than in the case of using a general base, the seal tape is detached immediately after the electrolyte solution is injected into the battery can, so that the unwinding of the electrode assembly is induced and the contact area between the negative electrode and the inside of the can can be thus increased more stably. In addition, the detachment time is shortened, so that there is an advantage in that mass production quality can be secured after battery production. On the other hand, if the detachment time is delayed and the attached state of the seal tape continues, there is a problem in that the resistance deviation of the battery may increase during mass production quality check.

In the present specification, the term "length direction" may refer to a direction perpendicular to the thickness direction of the base when the base is kept horizontal. In addition, in the present specification, the term "perpendicular" or "horizontal" refers to "substantially perpendicular or horizontal" within a range that does not impair the desired effect, and for example, may include an error of about ±10 degrees, ±5 degrees or ±3 degrees.

As the base, a base that can be deformed, e.g., expanded, in any direction including a transverse, longitudinal, or diagonal direction on a plane of the base, as long as it has a property to deform, e.g., expand, in the length direction.

In an exemplary embodiment of the present invention, the base may have a deformation ratio of 10% or greater in the length direction in accordance with Equation 2 below.

$$\text{deformation ratio of the base in the length direction} = (L2-L1)/L1 \times 100 \quad \text{[Equation 2]}$$

in Equation 2,

L1 is an initial length of the base before contact with a fluid, and L2 is a length of the base measured after the base is brought into contact with the fluid at a room temperature or 60° C. for 24 hours.

In calculating Equation 2, a specific type of fluid with which the base is brought into contact is not particularly limited. According to one example, the fluid may be a liquid electrolyte solution injected into the can. The term "electrolyte solution" may refer to, for example, a medium for ion conduction used in a battery or the like. In addition, the term "room temperature" is a natural temperature that is not heated or cooled, and for example, may refer to a temperature of about 10° C. to about 30° C., about 20° C. to about 30° C. or about 25° C.

The deformation ratio of the base in the length direction may be 30% or greater, 40% or greater, 50% or greater, 60% or greater, 70% or greater, 80% or greater, or 90% or greater. The upper limit of the deformation ratio of the base in the length direction is not particularly limited. That is, the greater the deformation ratio value, the easier the detachment of the seal tape may be induced. For example, the upper limit of the deformation ratio of the base may be 500%.

In Equation 2, L1 and L2 are lengths of the base before and after contact with the fluid. The length is measured in a predetermined direction with respect to the base, and a specific direction for measuring the lengths is not particularly limited as long as the same direction is applied at the time of measuring the lengths L1 and L2.

For example, when the base has a rectangular sheet shape, the length of the base may be a horizontal, vertical or diagonal length of the sheet, or a length in any direction on a plane. However, when measuring the lengths L1 and L2, the same direction for measuring the lengths is applied. Therefore, for example, when the horizontal length of the base is employed as the length L1, the horizontal length of the base is also employed as the length L2.

The shape of the base is not particularly limited, and may be, for example, a film or sheet shape. In addition, the film or sheet-shaped base may have a shape such as a rectangle, a circle, a triangle, or an amorphous shape.

The base may have a Shore A hardness of 70 A or higher according to ASTM D2240. The base may have a Shore D hardness of 40D or higher according to JIS K-7311. The upper limit of the hardness of the base is not particularly limited, but, for example, the upper limit of the Shore A hardness may be 100 A or 95 A, and the upper limit of the Shore D hardness may be, for example, 100D or 85D.

The base may include a thermoplastic polyurethane film (TPU film). The base may have a single-layer structure of a thermoplastic polyurethane film or a multi-layer structure including at least one layer of a polyurethane film, for example, a two-layer structure. In addition, as the thermoplastic polyurethane film, a uniaxially or biaxially stretched film or a non-stretched film may be used.

As the thermoplastic polyurethane film, a polyester TPU film, a polyether TPU film, a polycaprolactone TPU film, and the like are known, and an appropriate type may be selected from these films. However, the use of a polyester TPU film may be appropriate. In addition, as the thermoplastic polyurethane film, an aromatic or aliphatic thermoplastic polyurethane film may be used. When using the thermoplastic polyurethane film, a release layer may be further included in order to secure peeling-off force through adhesive force control.

As the thermoplastic polyurethane film, a reactant of a mixture including a polyol compound such as a polyester polyol compound, a chain extender and an isocyanate compound such as an aromatic or aliphatic diisocyanate compound may be used. A thermoplastic polyurethane film having desired physical properties may be provided by controlling ratios, types and the like of the polyol compound forming the soft chain, and the chain extender and the isocyanate compound forming the hard chain. In one example, the base may include a polyester-based TPU film, and when needed, a film having a weight ratio in a unit derived from polyester polyol from the polyurethane and a unit derived from an isocyanate compound and/or a chain extender, which is controlled within an appropriate range, may be used.

As described above, when the thermoplastic polyurethane film is used as the base, an electrolyte solution absorption rate of the adhesive layer is further increased because the electrolyte solution moves more freely through the base.

When the base includes another film as well as the thermoplastic polyurethane film, another film may be a polymer film or sheet, which is manufactured to exhibit deformation characteristics, for example, expansion characteristics as described above when in contact with a fluid under extension or contraction processing conditions in manufacturing processes of the film or sheet.

According to one example, the other film may be a film including an ester bond or an ether bond, or a cellulose ester compound. For example, an acrylate-based film, an epoxy-based film, or a cellulose-based film may be exemplified.

In another exemplary embodiment, the base may include a film including a porous structure. Specifically, a separator, a nonwoven fabric, a fiber, or paper may be used as a film having a porous structure, and structures known in the art may be appropriately employed without being limited thereto.

As described above, when a film having a porous structure is used as the base, an electrolyte solution absorption rate of the adhesive layer is further increased because the electrolyte solution moves more freely through the base. Therefore, since the seal tape is detached more quickly than in the case of using a general base, the seal tape is detached immediately after the electrolyte solution is injected into the battery can, so that the unwinding of the electrode assembly is induced and the contact area between the negative electrode and the inside of the can can be thus increased more stably. In addition, the detachment time is shortened, so that there is an advantage in that mass production quality can be secured after battery production. On the other hand, if the detachment time is delayed and the attached state of the seal tape continues, there is a problem in that the resistance deviation of the battery may increase during mass production quality check.

A method of manufacturing the base is not particularly limited, and, for example, a usual film or sheet forming method such as a method of extruding or casting a raw material including the resin may be used. In this case, if necessary, a known additive may be used with included to the raw material including the resin.

When the base as described above has a sheet or film shape, a thickness of the base is not particularly limited, and may be, for example, about 10 μm to 200 μm, about 10 μm to 100 μm, about 10 μm to 50 μm, about 15 μm to 30 μm, or about 15 μm to 20 μm.

A secondary battery according to an exemplary embodiment of the present invention includes an electrode assembly having a structure in which a positive electrode, a negative electrode, and a separator are wound; an electrolyte solution; and a can in which the electrode assembly and the electrolyte solution are accommodated, wherein the negative electrode is positioned on an outer circumferential surface of the electrode assembly, and wherein a seal tape is provided on the outer circumferential surface. In this case, the seal tape includes a base and an adhesive layer provided on one surface of the base, and the adhesive layer has expansibility with respect to the electrolyte solution and can absorb the electrolyte solution and expand after contact with the electrolyte solution.

The electrode assembly may have a structure in which a positive electrode, a negative electrode, and a separator provided between the positive electrode and the negative electrode are wound, and the negative electrode may be positioned on an outer circumferential surface of the electrode assembly.

The seal tape may be attached to the outer circumferential surface of the electrode assembly via the adhesive layer. The electrode assembly may be wound in a jelly-roll shape.

In an exemplary embodiment of the present invention, the negative electrode may include a negative electrode coated portion, and a negative electrode uncoated portion, and the negative electrode uncoated portion may be positioned on the outer circumferential surface of the electrode assembly. That is, the negative electrode uncoated portion may be positioned on the outer circumferential surface of the electrode assembly, and the seal tape may be provided on the negative electrode uncoated portion.

In an exemplary embodiment of the present invention, the negative electrode may include a negative electrode coated portion, and a negative electrode uncoated portion, and the negative electrode coated portion may be positioned on the outer circumferential surface of the electrode assembly. That is, the negative electrode coated portion may be positioned on the outer circumferential surface of the electrode assembly, and the seal tape may be provided on the negative electrode coated portion.

In an exemplary embodiment of the present invention, the negative electrode may include a negative electrode coated portion, and a negative electrode uncoated portion, and the negative electrode coated portion and the negative electrode uncoated portion may be positioned together on the outer circumferential surface of the electrode assembly. That is, the negative electrode coated portion coated with a negative electrode active material and the negative electrode uncoated portion not coated with the negative electrode active material may be simultaneously positioned on the outer circumferential surface of the electrode assembly, and the seal tape may be provided on the negative electrode coated portion and the negative electrode uncoated portion.

The positive electrode may include a positive electrode current collector and a positive electrode active material coated on the positive electrode current collector. Specifically, the positive electrode includes a positive electrode current collector, a positive electrode coated portion provided with a positive electrode active material layer on the positive electrode current collector, and a positive electrode uncoated portion not provided with the positive electrode active material layer on the positive electrode current collector. Specifically, the positive electrode coated portion may be formed by coating a positive electrode active material on one surface or both surfaces of the positive electrode current collector, and the positive electrode current collector may be exposed on the positive electrode uncoated portion not coated with the positive electrode active material. Here, the positive electrode current collector may be composed of, for example, a foil made of aluminum (Al). In this case, the positive electrode active material may be composed of, for example, lithium manganese oxide, lithium cobalt oxide, lithium nickel oxide, lithium iron phosphate, or a compound or mixture containing one or more thereof.

The negative electrode may include a negative electrode current collector and a negative electrode active material coated on the negative electrode current collector. Specifically, the negative electrode includes a negative electrode current collector, a negative electrode coated portion provided with a negative electrode active material layer on the negative electrode current collector, and a negative electrode uncoated portion not provided with the negative electrode active material layer on the negative electrode current collector. Specifically, the negative electrode coated portion may be formed by coating a negative electrode active material on one surface or both surfaces of the negative electrode current collector, and the negative electrode current collector may be exposed on the negative electrode uncoated portion not coated with the negative electrode active material. Here, the negative electrode current collector may be composed of, for example, a foil made of copper (Cu) or nickel (Ni). In this case, the negative electrode active material may be made of a material including, for example, artificial graphite. In addition, the negative electrode active material may be composed of, for example, lithium metal, lithium alloy, carbon, petroleum coke, activated carbon, graphite, a silicon compound, a tin compound, a titanium compound, or an alloy thereof.

The separator separates and electrically insulates the positive electrode and the negative electrode. Here, the positive electrode and the negative electrode may be wound together with the separator to form a jelly-roll type electrode assembly, or may be formed into a stack type electrode assembly or a stack and folding type electrode assembly.

The separator is made of an insulating material and may be alternately laminated with a positive electrode and a negative electrode. Here, the separator may be positioned between the positive electrode and the negative electrode and on outer surfaces of the positive electrode and the negative electrode.

As the separator, any separator may be used without particular limitation as long as it is typically used for a secondary battery, and particularly, a separator having high moisture-retention ability for an electrolyte solution as well as a low resistance to movement of electrolyte solution ions is preferably used.

In addition, the separator may be made of a flexible material. In this case, the separator may be formed of, for example, a polyolefin-based resin film such as polyethylene and polypropylene having microporosity. As another example, a porous polymer film, for example, a porous polymer film manufactured from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. In addition, a typical porous non-woven fabric, for example, a non-woven fabric formed of high melting point glass fibers, polyethylene terephthalate fibers, or the like may be used. Furthermore, a coated separator including a ceramic component or a polymer material may be used to secure heat resistance or mechanical strength, and the separator having a single layer or multi-layer structure may be selectively used.

In the above, a type of electrolyte solution, which is a fluid for deforming, for example, expanding the adhesive layer of the seal tape, is not particularly limited, and an electrolyte solution known in the art is used depending on a type of battery.

In one example, the electrolyte solution may be, but is not limited to, for example, an organic liquid electrolyte, an inorganic liquid electrolyte, a solid polymer electrolyte, a gel-type polymer electrolyte, a solid inorganic electrolyte, a molten-type inorganic electrolyte and the like that may be used in the manufacture of the secondary battery.

Specifically, the electrolyte solution may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimetoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, propylene carbonate derivative, tetrahydrofuran derivative, ether, methyl propionate, or ethyl propionate may be used.

In particular, among the carbonate-based organic solvents, ethylene carbonate and propylene carbonate, which are cyclic carbonates, are high-viscosity organic solvents and can be preferably used because they have high permittivity to dissociate a lithium salt well. When the cyclic carbonate is mixed with a linear carbonate with low viscosity and low permittivity, such as dimethyl carbonate or diethyl carbonate, in a suitable ratio and used, an electrolyte solution with high electric conductivity may be prepared, and therefore, may be more preferably used.

A lithium salt may be used as the metal salt, and the lithium salt is a material that is readily soluble in the non-aqueous electrolyte solution, in which, for example, one or more species selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as an anion of the lithium salt. A concentration of the lithium salt in the electrolyte may vary depending on the use, and may be typically used within a range of 0.1M to 2.0M.

One or more additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte solution for the purpose of improving life characteristics of the battery, suppressing a decrease in battery capacity, improving discharge capacity of the battery, and the like, in addition to the above-described electrolyte solution components.

The can in which the electrode assembly and the electrolyte solution are accommodated may be a cylindrical can, but is not limited thereto.

The secondary battery may be manufactured by attaching the seal tape to an electrode assembly, accommodating the electrode assembly in a can, injecting an electrolyte solution into the can, and then sealing the can.

The seal tape is inserted into the can in a state of being fixed to the electrode assembly, and then absorbs the electrolyte solution injected into the can and expands. As a result, the peeling-off force between the adhesive layer and the electrode assembly is lowered, and thus, the adhesive layer of the seal tape can be detached from the electrode assembly. Therefore, the secondary battery according to an exemplary embodiment of the present invention may have a structure including a region in which the electrode assembly is unwound to some extent and the outer circumferential surface of the electrode assembly is in contact with an inside of the can.

FIG. 1 schematically shows a secondary battery according to an exemplary embodiment of the present invention.

Referring to FIG. 1, the secondary battery includes an electrode assembly 11 and a seal tape 12 attached on an outer circumferential surface of the electrode assembly 11.

Part (1-1) of FIG. 1 is a schematic diagram of the secondary battery from a process of attaching the seal tape 12 to the electrode assembly 11 to a process of accommodating the electrode assembly inside a can. The seal tape 12 is attached on the outer circumferential surface of the electrode assembly 11, so that the electrode assembly 11 is fixed, and a gap between the inside of the can 10 and the electrode assembly 11 is formed to some extent.

Part (1-2) of FIG. 1 is a schematic diagram of the secondary battery after injecting an electrolyte solution into the can 10. The seal tape 12 absorbs the electrolyte solution, and detaches from the electrode assembly 11 as the peeling-off force decreases. Therefore, the wound electrode assembly 11 is unwound to some extent, so that the gap between the inside of the can 10 and the electrode assembly 11 is reduced. In this case, although not clearly shown in part (1-2) of FIG. 1, the outer circumferential surface of the electrode assembly may contact the inside of the can.

That is, the secondary battery according to an exemplary embodiment of the present invention includes a region in which the inside of the can and the outer circumferential surface of the electrode assembly are in contact with each other. In this case, the contact area between the inside of the can and the outer circumferential surface of the electrode assembly may be 5% or greater based on a total area of the outer circumferential surface of the electrode assembly. Alternatively, the contact area may be 10% or greater, 20% or greater, 30% or greater, 40% or greater, or 50% or greater, and 100% or less, 90% or less, 80% or less, 70% or less, or 60% or less.

FIG. 2 schematically shows a secondary battery according to an exemplary embodiment of the present invention. Referring to FIG. 2, the seal tape 12 may be attached to surround the outer circumferential surface of the electrode assembly 11.

Specifically, the seal tape 12 may be provided to surround the outer circumferential surface of the electrode assembly 11, including a finishing portion 21 where the outermost end portion of the outer circumferential surface of the electrode assembly 11 is positioned. That is, the seal tape 12 may be provided while surrounding the outer circumferential surface in a width direction (direction perpendicular to the height direction) of the electrode assembly 11. In this case, the configuration that the seal tape is provided to surround the outer circumferential surface means that the seal tape is continuously provided without disconnection along the outer circumferential surface of the electrode assembly.

Specifically, the seal tape 12 may be provided on an upper part 31 and a lower part 33 of the outer circumferential surface of the electrode assembly 11, respectively. That is, a total of two lines of seal tape may be attached on the outer circumferential surface of the electrode assembly. In this case, the upper part 31 and the lower part 33 refer to an upper region and a lower region with respect to a central part 32 of the outer circumferential surface, respectively. In addition, an upper end portion 41 and a lower end portion 42 of the outer circumferential surface of the electrode assembly may be provided such that the electrode assembly is exposed as it is. However, the present application is not limited thereto, and the seal tape may be attached to an appropriate position according to a size, a type and the like of the battery so as to appropriately control the detachment time.

The seal tape 12 may be provided in a region not including the central part 32 of the outer circumferential surface, based on the height of the electrode assembly 11. In this case, the central part 32 may refer to a region up to ±1% (based on the height) upward and downward from a center of the outer circumferential surface.

If the seal tape is attached including the central part of the outer circumferential surface, even when the seal tape absorbs the electrolyte solution and is deformed, it is difficult to induce unwinding of the electrode assembly, making it impossible to secure a contact area between the negative electrode and the inside of the can. On the other hand, when the seal tape is attached on the upper and lower parts of the outer circumferential surface, not including the central part of the outer circumferential surface, as in an embodiment of the present invention, it is easy to induce unwinding of the electrode assembly, thereby increasing the contact area between the negative electrode and the inside of the can to facilitate implementation of low resistance characteristics.

The area where the seal tape is attached on the outer circumferential surface of the electrode assembly may be controlled according to a size, a type, and the like of the battery so as to appropriately control the detachment time. In one example, the attachment area of the seal tape may be less than 80%, less than 70%, less than 60%, less than 50%, less than 40%, or less than 30%, and 5% or greater, 10% or greater or 20% or greater of the total area of the outer circumferential surface of the electrode assembly, but is not limited thereto.

In another exemplary embodiment, the seal tape may be provided on the finishing portion where the outermost end portion of the outer circumferential surface of the electrode assembly is positioned. Specifically, although not shown in the drawings, the seal tape may be attached in a height direction on the finishing portion where the outermost end portion of the outer circumferential surface of the electrode assembly is positioned. That is, the seal tape may be attached in one line in a form of covering the finishing portion where the outermost end portion of the outer circumferential surface of the electrode assembly is positioned. However, the present application is not limited thereto, and the seal tape may be attached to an appropriate position according to a size, a type, and the like of the battery so as to appropriately control the unwinding of the electrode assembly.

When the seal tape is attached in the height direction on the finishing portion of the electrode assembly, it can be attached in a form of continuously covering the finishing portion of the electrode, thereby preventing damage to the electrode assembly, and increasing the contact area between the negative electrode and the inside of the cylindrical can to facilitate implementation of low resistance characteristics.

In an exemplary embodiment of the present invention, an average gap between the inside of the can and the outer circumferential surface of the electrode assembly before the seal tape is detached, i.e., a difference between an average inner diameter of the can and an average outer diameter of the electrode assembly may be greater than 0.9% and less than or equal to 2%, based on an inner diameter of the can. Specifically, the difference may be 1.5% or less, 1.3% or less, 1.2% or less, 1.1% or less, or 1% or less.

In an exemplary embodiment of the present invention, the average gap between the inside of the can and the outer circumferential surface of the electrode assembly after the seal tape is detached, i.e., the difference between the average inner diameter of the can and the average outer diameter of the electrode assembly may be 0.9% or less based on the inner diameter of the can. Specifically, the difference may be 0.8% or less, 0.7% or less, 0.6% or less, 0.5% or less, 0.4% or less, 0.3% or less, or 0.2% or less, and 0% or more, greater than 0%, or 0.1% or greater.

In an exemplary embodiment of the present invention, the electrode assembly may include one negative electrode tab. In general, an electrode assembly in which a separator is positioned on an outer circumferential surface includes a plurality of negative electrode tabs in order to realize low resistance. In this case, it is not easy to secure weldability of the negative electrode tabs, and it is difficult to secure an internal space of the can. On the other hand, according to an embodiment of the present invention, the negative electrode is positioned on the outer circumferential surface of the electrode assembly, and the contact area between the negative electrode and the inside of the can is increased to implement the low resistance. Therefore, even when one negative electrode tab is included, high low-resistance characteristics can be implemented, and at the same time, the cost can be reduced, the internal space of the can can be secured, and the weldability of the negative electrode tab can be secured.

Hereinafter, Examples will be described in detail to specifically describe the present specification. However, the Examples according to the present specification may be modified in other forms, and the scope of the present application is not construed as being limited to the following Examples. The Examples of the present application are provided to more completely explain the present specification to one skilled in the art.

Example 1

(1) Preparation of Seal Tape

A monomer mixture composed of 68 parts by weight of n-butyl acrylate (n-BA), 30 parts by weight of methoxy ethyl acrylate (MEA), and 2 parts by weight of hydroxybutyl acrylate (HBA), and 0.02 part by weight of n-dodecanethiol as a chain transfer agent were put into a 1000 cc reactor where a nitrogen gas was refluxed and a cooling device was equipped to easily control a temperature, and 150 parts by weight of ethyl acetate (EAc) as a solvent was added. Then, after purging with a nitrogen gas was performed at 60° C. for 60 minutes in order to remove oxygen, the reactor temperature was maintained at 60° C. After the mixture was homogenized, 0.04 part by weight of azobisisobutyronitrile (AIBN) as a reaction initiator was added. The mixture was subjected to reaction for 8 hours to prepare a polymer having a weight average molecular weight of 780,000. In the above, part by weight means wt %.

Based on 100 parts by weight of the polymer prepared described above, 0.3 part by weight of tolylene diisocyanate adduct of trimethylolpropane as a multifunctional isocyanate-based crosslinking agent was put to an ethyl acetate solution, which was then diluted to an appropriate concentration in consideration of coatability, and uniformly mixed.

The adhesive composition prepared as described above was coated and dried on one surface of a PET (poly(ethylene terephthalate)) film (thickness: 12 μm) to form a uniform adhesive layer having a thickness of 5 μm. Subsequently, a release film was laminated on the coating layer, and then, aged for 3 days under conditions of a constant temperature (25° C.) and a constant humidity to prepare a seal tape.

(2) Preparation of Secondary Battery

The seal tape was attached to cover about 30% of an area of an outer circumferential surface of a jelly roll-shaped electrode assembly (diameter of a cross-section: 20.5 mm) in which a negative electrode, a positive electrode and a separator were wound and the negative electrode was provided on an outer circumferential surface, and the assembly was inserted into a cylindrical can (diameter of a cross-section: 21.05 mm). Subsequently, a secondary battery was prepared by injecting a carbonate-based electrolyte solution into the can and sealing it.

Example 2

A secondary battery was prepared in the same manner as in Example 1, except that an unstretched PU film (thickness: 40 μm) made of thermoplastic polyurethane (TPU), instead of the PET film of Example 1, was used as a base.

Comparative Example 1

A secondary battery was prepared in the same manner as in Example 1, except that a monomer mixture composed of 98 parts by weight of n-butyl acrylate and 2 parts by weight of hydroxybutyl acrylate was added, instead of the monomer mixture of Example 1.

Experimental Example

In the secondary batteries prepared in the Examples and the Comparative Example, ACIR (alternating current internal resistance) was measured by bringing probes of a charge/discharge measuring device (PNE Solution Co., Ltd.) into contact with the positive and negative electrodes at room temperature. In addition, whether the expansion of the adhesive layer of the seal tape and the time at which the seal tape was detached from the electrode assembly were measured, and the results are shown in Table 1 below.

FIG. 3 is a CT image of the batteries prepared in Example 1 and Comparative Example 1. It could be confirmed that, in the case of Comparative Example 1, the seal tape was not detached, resulting in a gap between the negative electrode and the inside of the can, and in the case of Example 1, the seal tape absorbed the electrolyte solution and expanded to induce unwinding of the electrode assembly, and there was almost no gap between the negative electrode and the inside of the can.

TABLE 1

|  | Whether the adhesive layer expanded | Attachment area of seal tape (Jelly roll, J/R) | ACIR (mΩ) | Detachment time |
|---|---|---|---|---|
| Example 1 | ○ | 10*60 mm² × 2ea | 12.06 | 5 h |
| Example 2 | ○ | 10*60 mm² × 2ea | 12.48 | 0.5 h |
| Comparative Example 1 | X | 10*60 mm² × 2ea | 18.36 | 2 days or longer |

In Table 1, in Examples 1 and 2, it could be confirmed that since the adhesive layer included the seal tape having expansibility with respect to the electrolyte solution, the unwinding of the electrode assembly was induced after injection of the electrolyte solution into the can, resulting in increase in the contact area between the negative electrode and the can to lower the internal resistance.

In addition, in Example 2, it could be confirmed that since the electrolyte solution diffusion rate was high due to diffusion of the electrolyte solution through the base, the seal tape was detached even earlier.

On the other hand, in the case of Comparative Example 1, it could be confirmed that the internal resistance was high because the adhesive layer did not have expansibility with respect to the electrolyte solution, so it was difficult to induce unwinding of the electrode assembly, making it impossible to secure a contact area between the negative electrode and the inside of the can.

Although the present invention has been described with reference to preferred embodiments, it will be understood by one skilled in the art that various modifications and variations can be made in the present invention without departing from the technical spirit and scope of the present invention.

The invention claimed is:

1. A secondary battery comprising:
    an electrode assembly having a structure in which a positive electrode, a negative electrode, and a separator are in a wound state;
    an electrolyte solution;
    a seal tape having a base and an adhesive layer provided on one surface of the base; and
    a can accommodating the electrode assembly and the electrolyte solution,
    wherein the negative electrode is disposed along an outer circumferential surface of the electrode assembly,
    wherein the seal tape is provided on the outer circumferential surface, and
    wherein the adhesive layer is configured to expand when in contact with the electrolyte solution, and
    wherein the seal tape is configured to detach from the outer circumferential surface of the electrode assembly, so as to increase a contact area between the negative electrode and the can.

2. The secondary battery of claim 1, wherein the adhesive layer is configured to absorb the electrolyte solution.

3. The secondary battery of claim 1, wherein an interior surface of the can contacts the outer circumferential surface of the electrode assembly.

4. The secondary battery of claim 1, wherein the negative electrode includes a finishing portion, the finishing portion being an outermost end portion of the outer circumferential surface,
wherein the seal tape surrounds at least a portion of the outer circumferential surface of the electrode assembly and at least a portion of the finishing portion.

5. The secondary battery of claim 1, wherein the seal tape is provided on an upper part and a lower part of the outer circumferential surface of the electrode assembly, respectively.

6. The secondary battery of claim 1, wherein the outer circumferential surface includes a central region in a height direction of the secondary battery, wherein the seal tape is provided in a region of the outer circumferential surface other than the central region.

7. The secondary battery of claim 1, wherein the negative electrode comprises a coated portion and an uncoated portion, and wherein the uncoated portion is positioned on the outer circumferential surface of the electrode assembly.

8. The secondary battery of claim 1, wherein the negative electrode comprises a coated portion, and an uncoated portion, and wherein the coated portion is positioned on the outer circumferential surface of the electrode assembly.

9. The secondary battery of claim 1, wherein the adhesive layer has a center line average roughness value in a range of 100 μm to 250 μm, wherein the center line average roughness value is measured after 24 hours from a time point after the adhesive layer contacts the electrolyte solution.

10. The secondary battery of claim 1, wherein the adhesive layer comprises a cured product of an adhesive composition; a monomer; and a crosslinkable monomer, wherein the cured product comprises a polymer having a polymerization unit derived from a (meth)acrylic acid ester monomer, wherein the monomer is represented by Chemical Formula 1 below, and wherein the crosslinkable monomer contains a crosslinkable functional group:

[Chemical Formula 1]

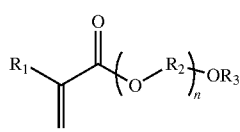

in Chemical Formula 1, $R_1$ is hydrogen or an alkyl group having 1 to 12 carbon atoms, $R_2$ is an alkylene group having 1 to 6 carbon atoms, $R_3$ is hydrogen, an alkyl group having 1 to 12 carbon atoms, an aryl group having 6 to 24 carbon atoms, or an arylalkyl group having 6 to 48 carbon atoms, and n is 0 or greater.

11. The secondary battery of claim 1, wherein the adhesive layer is provided as a pattern on the one surface of the base.

12. The secondary battery of claim 1, wherein the base is configured to expand when in contact with the electrolyte solution.

13. The secondary battery of claim 1, wherein a deformation ratio of the base in a length direction is 10% or greater based on Equation 2:

$$\text{deformation ratio} = (L2 - L1)/L1 \times 100 \qquad \text{[Equation 2]}$$

in Equation 2,

L1 is an initial length of the base before contact with a fluid, and L2 is a length of the base measured after contact with the fluid at room temperature for 24 hours.

14. The secondary battery of claim 1, wherein the base comprises a thermoplastic polyurethane film.

15. The secondary battery of claim 1, wherein the base comprises a film having a porous structure.

16. The secondary battery of claim 1, wherein the electrode assembly includes at least one negative electrode tab.

17. The secondary battery of claim 1, wherein the contact area is greater than or equal to 5% based on a total area of the outer circumferential surface of the electrode assembly.

18. The secondary battery of claim 11, wherein the pattern includes one or more of a closed figure pattern, a linear pattern, a lattice pattern, a wavy pattern, an embossed pattern, or an S-shaped pattern.

19. The secondary battery of claim 3, wherein an average gap between the interior surface of the can and the outer circumferential surface of the electrode assembly before the seal tape is detached is in a range from 0.9% to 2%, based on an inner diameter of the can.

* * * * *